C. HART.
Car Wheel.
No. 10,309. Patented Dec. 13, 1853.
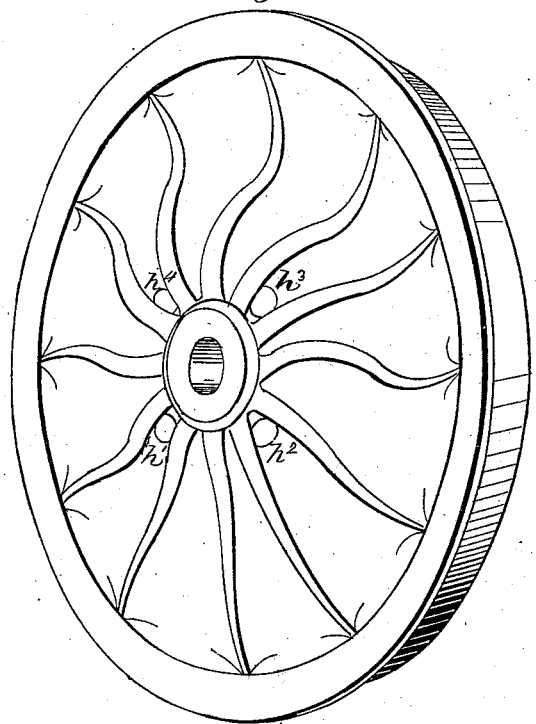
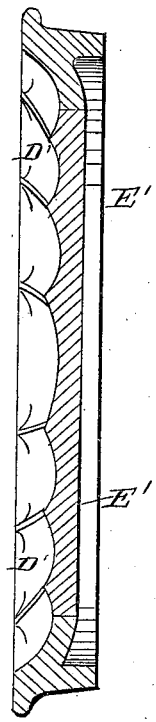
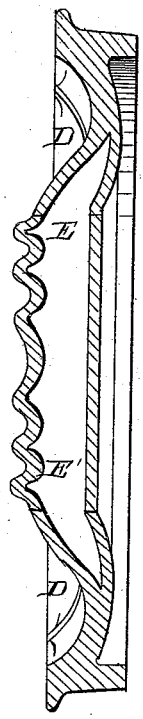
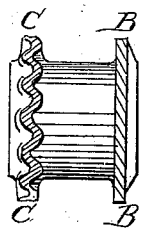
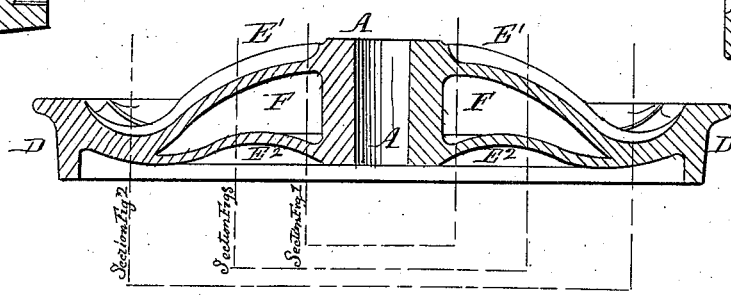

UNITED STATES PATENT OFFICE.

CARMI HART, OF BRIDGEPORT, CONNECTICUT.

CAR-WHEEL.

Specification of Letters Patent No. 10,309, dated December 13, 1853.

*To all whom it may concern:*

Be it known that I, CARMI HART, of Bridgeport, Connecticut, iron-founder, have invented a new and useful Improvement in Cast-Iron Railroad-Car Wheels, and that the following is a full and particular description thereof, reference being had to the drawings.

Figure 1 of drawings is a section of the hub and the lines represent the lines of contact of the two plates upon the outer surface of the hub, B the line of contact of the front plate, C the line of contact of the back plate. Figs. 2, and 5, represent a section of the inner surface of the rim, $D'$ being the rim itself, $E'$ being the line of contact of the two plates united and the points of the ribs. Fig. 3, represents a vertical section through the center of the wheel, $E'$, the inner plate, $E''$ the exterior plate, D, D, the rim, F the arch formed by the two plates, A the hub. Fig. 4, is a perspective view of the wheel as seen at the back plate $h^1$ $h^2$ $h^3$ $h^4$ being holes for taking out the core forming the arch or hollow space between the plates.

My wheel consists of a hub and rim in the usual form, the depth of the hub in the line of the axle being considerable to form a sufficient space for the base of the arch between the two plates. The hub and rim are connected by two plates, which meet together about two thirds the distance from hub to rim and thence unite as one plate to the rim the front and back plate resting upon the front and back of the hub forming an arch with its base resting upon the hub. The back plate is curved in ogee from the hub to the rim, curving out gently from its point of contact with the inner end of the hub, as seen in $E'$ $E'$ Fig. 3, and curving also gently outward as it connects with the rim at its inner edge. This plate also is a series of ogees circularly from spoke to spoke or radii are not separate arms nor are they placed upon the surface of the plate, but they are formed by the circular ogees or corrugations of the plate and are hollow inside and project on the outside of this inner plate, and are a part of the plate itself. They are formed as ogees in two directions, that is, from hub to rim and sidewise or laterally upon the plate, the exterior or front, plate of the wheel is what is commonly termed a plain plate, it springs from the front end of the hub and extends to its point of contact with the back plate in an ogee corresponding in its lines or curves with those of the back plate, thus forming double ogees similar in their curves and also an arch of the ogee form; at the point of contact of the two plates, this front plate becomes one with the back plate the two united extending to the rim as one, but still inside and outside in the form of an ogee. This arrangement produces what is called a plain plate for the exterior surface of the wheel with a corrugated or wavy surface of ogees in two directions for the interior surface of the wheel, with ribs forming part of this plate itself and which ribs are hollow and are also ogees in two directions.

The rim of the wheel is cast with a chill in the usual manner. In cooling the metal with the chill upon the rim, the curves in the plates falling into each other and being also ogee curves similar to the ogee curves in the spokes, the spokes also being hollowed and open in their inner surface, every part admits of an easily and equable contraction. The diminished and wavy line of contact upon the rim admits also of easy contraction in the circle and does not cause bubbling or honeycombing of the metal in the rim.

What I claim as my invention and improvement in the above, is—

The arrangement of the plates of the wheel in the arch at the hub so that its opposite sides curve in similar curves adapting themselves to each other and are also ogees, and whose continuation from the apex or point of union is also an ogee to the rim, in combination with the spokes or radii which are ogees on the surface of the inner plate and also ogees sidewise and forms a continuous part of the inside plate itself.

CARMI HART.

Witnesses:
GEORGE F. STOCKWELL,
SIMON M. FORTS.